US012308152B2

(12) United States Patent
Zhou et al.

(10) Patent No.: US 12,308,152 B2
(45) Date of Patent: May 20, 2025

(54) 220KV TRANSFORMER MOVABLE SLEEVE FOR EASY MAINTENANCE

(71) Applicant: HUANENG SHANGHAI SHIDONGKOU SECOND POWER PLANT, Shanghai (CN)

(72) Inventors: Liren Zhou, Shanghai (CN); Yuqing Sang, Shanghai (CN); Yan Sun, Shanghai (CN); Shuang Hao, Shanghai (CN); Guoping Tong, Shanghai (CN); Zhengrong Li, Shanghai (CN); Jie Lv, Shanghai (CN)

(73) Assignee: HUANENG SHANGHAI SHIDONGKOU SECOND POWER PLANT, Shanghai (CN)

( * ) Notice: Subject to any disclaimer, the term of this patent is extended or adjusted under 35 U.S.C. 154(b) by 713 days.

(21) Appl. No.: 17/711,057

(22) Filed: Apr. 1, 2022

(65) Prior Publication Data

US 2022/0319757 A1 Oct. 6, 2022

(30) Foreign Application Priority Data

Apr. 1, 2021 (CN) ......................... 202110353860.3

(51) Int. Cl.
*H01F 27/02* (2006.01)

(52) U.S. Cl.
CPC .................................... *H01F 27/02* (2013.01)

(58) Field of Classification Search
CPC ........ H01F 27/02; H01F 27/04; H01F 27/306; H01F 2027/348; H01F 27/2828; H01F 27/34
USPC ....................................... 336/65, 90, 96, 107
See application file for complete search history.

(56) References Cited

U.S. PATENT DOCUMENTS

2022/0319756 A1* 10/2022 Zhou .................. H01F 27/2828

FOREIGN PATENT DOCUMENTS

CN 108550457 A * 9/2018
CN 208690818 U * 4/2019

* cited by examiner

*Primary Examiner* — Tuyen T Nguyen
(74) *Attorney, Agent, or Firm* — IDEA Intellectual Limited; Margaret A. Burke; Sam T. Yip

(57) ABSTRACT

Provided in the present invention is a 220 KV transformer movable sleeve for easy maintenance which includes a sleeve assembly and a connecting component. The sleeve assembly includes a sleeve and an end cap, and the access port is provided on the sleeve, the access port is matched with the end cap, and the connecting component includes a rotating part, a moving part and a driving part. The access port is arranged on the sleeve assembly, and the inspection can only be carried out by opening the access port during inspection, without dismantling the entire movable sleeve, and greatly improving the work efficiency. The rubber strip is combined with the metal sleeve. The method reduces the influence of magnetic flux leakage on the metal movable sleeve and prevents it from generating eddy current heating. Through the driving part, the end cap can be automatically opened, saving time and effort.

10 Claims, 5 Drawing Sheets

220KV TRANSFORMER MOVABLE SLEEVE FOR EASY MAINTENANCE

FIELD OF THE INVENTION

The present invention belongs to the technical field of transformers, and specifically relates to a 220 KV transformer movable sleeve which is convenient for maintenance.

BACKGROUND OF THE INVENTION

The movable sleeve on the low-voltage side of a high-voltage transformer is the connection point between the generator outlet and the transformer. During maintenance tasks on the transformer, it is necessary to remove the movable sleeve when disassembling the low-voltage side outlet. When a power plant performs routine temperature checks, the main transformer movable sleeve undergoes different degrees of heating. Since the sleeve also functions to seal the device, prolonged heat generation will cause metal aging and reduce the service life, and at the same time affect the performance of the sealing strip at the flange of the sleeve. Moreover, during maintenance, the operation process is too cumbersome. It is necessary to disassemble the movable sleeve structure as a whole and hang it down with a rope.

SUMMARY OF THE INVENTION

The purpose of this section is to outline some aspects of the embodiments of the present invention and briefly introduce some preferred embodiments. Some simplifications or omissions may be made in this part, the description, abstract and the title of the invention in this application to avoid obscuring the purpose of this part, the description, abstract and the title of the invention, and such simplifications or omissions cannot be used to limit the scope of the present invention.

In view of the above technical defects in 220 KV transformer movable sleeves, the present invention is provided.

Therefore, the problem to be solved by the present invention is the difficulty of disassembling the movable sleeve of a 220 KV transformer.

In order to solve the above technical problems, the invention provides the following technical solutions: A 220 KV transformer movable sleeve includes sleeve assembly 100, wherein the sleeve assembly 100 comprises a sleeve 101 and an end cap 102, wherein the sleeve 101 is provided with an access port M, wherein the access port M cooperates with the end cap 102; and a connecting component 200, wherein the connecting component 200 is configured to connect the access port M and the end cap 102, which includes a rotating part 201, a moving part 202 and a driving part 203, the rotating part 201 comprising a first trajectory plate 201*a* fixed on the inner side of the access port M, a first connecting plate 201*b* arranged on the side of a first trajectory plate 201*a*, a first connecting column 201*c* connecting the two first connecting plates 201*b*, a first gear shaft 201*d* arranged on one side of the first connecting column 201*c*, a first connecting lever 201*e* hinging on the first connecting column 201*c*, a second connecting lever 201*g* fixedly connecting to the first gear shaft 201*d* and a first gear 201*f* arranging on the first gear shaft 201*d*; the moving part 202 is symmetrically arranged with the rotating part 201, which comprises a second trajectory plate 202*a* fixed on the inner side of the access port M, a second connecting plate 202*b* arranged on the side of the second track plate 202*a*, a second connecting column 202*c* connecting the two second connecting plates 202*b*, a third gear shaft 202*d* arranging on one side of the second connecting column 202*c*, a third connecting lever 202*e* fixedly connecting to the third gear shaft 202*d*, and a third gear 202*f* arranging on the third gear shaft 202*d*, and the side of the third connecting lever 202*e* is fitted with the second connecting column 202*c*; the driving part 203 is configured to drive the first gear 201*f* and the third gear 202*f* to rotate.

Being a preferred embodiment of the 220 KV transformer movable sleeve for easy maintenance in the present invention. The driving part 203 comprises a fourth gear 203*b* engaged with the first gear 201*f*, a driving lever 203*c* matched with the first gear 201*f* and the fourth gear 203*b*, and a motor 203*d* matched with the driving lever 203*c*.

Being a preferred embodiment of the 220 KV transformer movable sleeve for easy maintenance in the present invention. One end of the first connecting plate 201*b* is fixed on the end cap 102, wherein the first trajectory plate 201*a* is provided with a trajectory slot 201*a*-1, and the first connecting plate 201*b* is provided with a snap cylinder 201*b*-1 matched with the trajectory slot 201*a*-1.

Being a preferred embodiment of the 220 KV transformer movable sleeve for easy maintenance in the present invention. The track slot 201*a*-1 comprising a vertical segment 201*a*-11 and a rotating segment 201*a*-12, the snap cylinder 201*b*-1 comprising a first cylinder 201*b*-11 and a second cylinder 201*b*-12, and the distance between the first cylinder 201*b*-11 and the second cylinder 201*b*-12 is the same as the radius of the rotating segment 201*a*-12, the joint point of the rotating segment 201*a*-12 and the vertical segment 201*a*-11 is arranged in the middle of the vertical segment 201*a*-11.

Being a preferred embodiment of the 220 KV transformer movable sleeve for easy maintenance in the present invention. The second trajectory plate 202*a* is provided with a moving slot 202*a*-1, the upper end of the moving slot 202*a*-1 is not closed, the second connecting plate 202*b* is provided with a third cylinder 202*b*-1 matched with the moving slot 202*a*-1, and the third cylinder 202*b*-1 is equal to the height of the second cylinder 201*b*-12.

Being a preferred embodiment of the 220 KV transformer movable sleeve for easy maintenance in the present invention. The sleeve 101 comprising a first half cylinder 101*a* and a second half cylinder 101*b*, and the first half cylinder 101*a* and the second half cylinder 101*b* are connected by bolts, the access port M is arranged in the middle of the first half cylinder 101*a*.

Being a preferred embodiment of the 220 KV transformer movable sleeve for easy maintenance in the present invention. The end cap 102 is provided with a sealing bulge 102*b*, and the access port M is provided with a sealing groove M-1 matched with the sealing bulge 102*b*.

Being a preferred embodiment of the 220 KV transformer movable sleeve for easy maintenance in the present invention. The sleeve assembly 100 further comprises a rubber strip 104, the inner sides of the first half cylinder 101*a* and the second half cylinder 101*b* are equidistantly provided with a plurality of slots 101*c* matched with the rubber strips 104.

Being a preferred embodiment of the 220 KV transformer movable sleeve for easy maintenance in the present invention. Any cross section of the rubber strip 104 is shaped like an isosceles trapezoid, and its smaller side is arranged on the inner side of the sleeve 101.

Being a preferred embodiment of the 220 KV transformer movable sleeve for easy maintenance in the present invention. The driving lever 203$c$ is a worm, and the first gear 201$f$ and the fourth gear 203$b$ are cooperated with the worm gear of the driving lever 203$c$ at the same time.

The beneficial result of the present invention is that the access port is arranged on the sleeve assembly, and the inspection can only be performed by opening the access port during inspection, and the entire movable sleeve does not need to be dismantled, thereby greatly improving the work efficiency. The combination of rubber strips and metal sleeves reduces the influence of magnetic flux leakage on the metal movable sleeve and prevents it from generating eddy current heating; the end cap can be automatically opened through the driving part, saving time and effort.

BRIEF DESCRIPTION OF THE DRAWINGS

In order to explain the technical solutions of the embodiments of the present invention more clearly, the following will briefly introduce the drawings used in the detailed description of the embodiments. Obviously, the drawings in the following description are only some embodiments of the present invention. For those of ordinary skill in the art, other drawings can be obtained from these drawings without creative effort, which includes.

DETAILED DESCRIPTION

Figure 1:
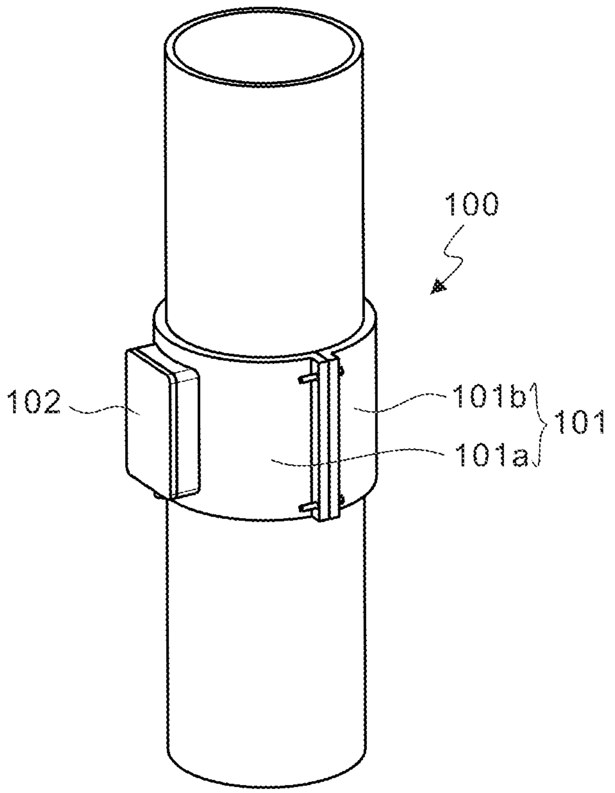
FIG. 1 is a scene diagram of a 220 KV transformer movable sleeve for easy maintenance in example 1.
Figure 2:
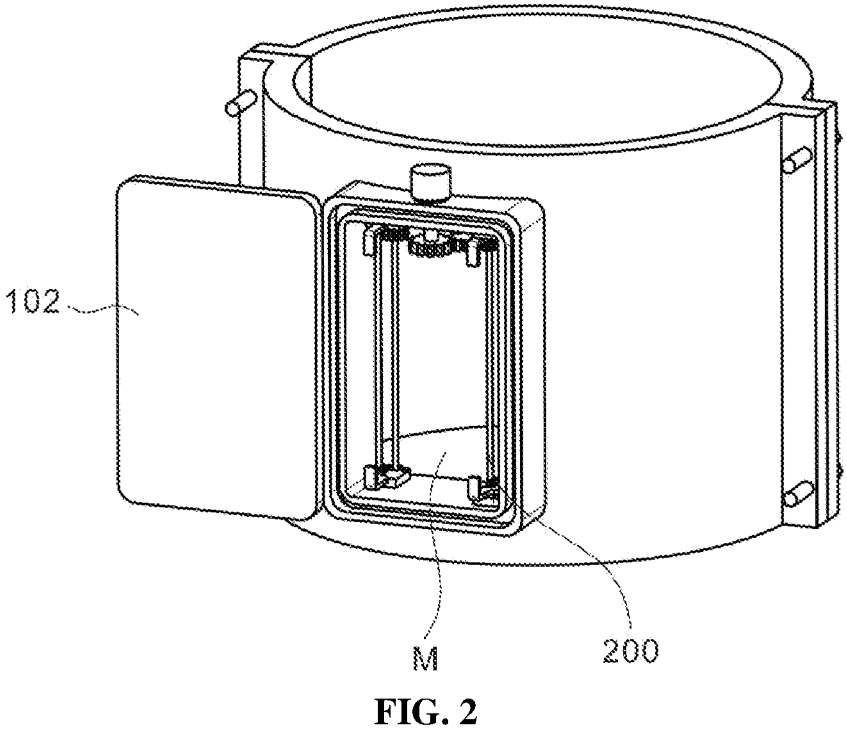
FIG. 2 is a structure diagram of a 220 KV transformer movable sleeve for easy maintenance in example 1.

In order to make the above-mentioned objects, features and advantages of the present invention more obvious and understandable, the specific embodiments of the present invention will be described in detail below in conjunction with specific embodiments.

In the following description, many specific details are explained in order to fully understand the present invention, but the present invention can also be implemented in other ways different from those described here. Those skilled in the art can make similar promotion without violating the connotation of the present invention. Therefore, the present invention is not limited by the specific embodiments disclosed below.

In addition, the "one embodiment" or "embodiment" referred to herein refers to a specific feature, structure, or characteristic that can be included in at least one implementation of the present invention. The appearances of "in one embodiment" in different places in this specification do not all refer to the same embodiment, nor are they separate or selectively mutually exclusive embodiments with other embodiments.

Example 1

Referring to FIGS. 1 to 9, the first embodiment of the present invention provides a 220 KV transformer movable sleeve that is convenient for maintenance. The 220 KV transformer movable sleeve for easy maintenance includes a sleeve assembly 100 and a connecting component 200, and the end cap 102 can be separated through the connecting component 200.

Specifically, the sleeve assembly 100 includes a sleeve 101 and an end cap 102, the sleeve 101 is provided with an access port M, and the access port M is matched with the end cap 102.

The connecting component 200 connects the access port M and the end cap 102, which includes a rotating part 201, a moving part 202 and a driving part 203.

The rotating part 201 comprises a first trajectory plate 201$a$ fixed on the inner side of the access port M, a first connecting plate 201$b$ arranged on the side of a first trajectory plate 201$a$, a first connecting column 201$c$ connecting the two first connecting plates 201$b$, a first gear shaft 201$d$ arranged on one side of the first connecting column 201$c$, a first connecting lever 201$e$ hinging on the first connecting column 201$c$, a second connecting lever 201$g$ fixedly connecting to the first gear shaft 201$d$ and a first gear 201$f$ arranging on the first gear shaft 201$d$; the moving part 202 is symmetrically arranged with the rotating part 201, which comprising a second trajectory plate 202$a$ fixed on the inner side of the access port M, a second connecting plate 202$b$ arranged on the side of the second track plate 202$a$, a second connecting column 202$c$ connecting the two second connecting plates 202$b$, a third gear shaft 202$d$ arranged on one side of the second connecting column 202$c$, a third connecting lever 202$e$ fixedly connecting to the third gear shaft 202$d$, and a third gear 202$f$ arranging on the third gear shaft 202$d$, and the side of the third connecting lever 202$e$ is fitted with the second connecting column 202$c$; the driving part 203 is configured to drive the first gear 201$f$ and the third gear 202$f$ to rotate.

Furthermore, the driving part 203 comprises a fourth gear 203$b$ engaged with the first gear 201$f$, a driving lever 203$c$ matched with the first gear 201$f$ and the fourth gear 203$b$, and a motor 203$d$ matched with the driving lever 203$c$.

Preferably, one end of the first connecting plate 201$b$ is fixed on the end cap 102, wherein the first trajectory plate 201$a$ is provided with a trajectory slot 201$a$-1, and the first connecting plate 201$b$ is provided with a snap cylinder 201$b$-1 matched with the trajectory slot 201$a$-1.

Preferably, the track slot 201$a$-1 comprising a vertical segment 201$a$-11 and a rotating segment 201$a$-12, the snap cylinder 201$b$-1 comprising a first cylinder 201$b$-11 and a second cylinder 201$b$-12, and the distance between the first cylinder 201$b$-11 and the second cylinder 201$b$-12 is the same as the radius of the rotating segment 201$a$-12, the joint point of the rotating segment 201$a$-12 and the vertical segment 201$a$-11 is arranged in the middle of the vertical segment 201$a$-11. That is, when the second cylinder 201$b$-12 rises to the top of the vertical segment 201$a$-11, the first cylinder 201$b$-11 just moves to the entrance of the rotating segment 201$a$-12.

Furthermore, the second trajectory plate 202*a* is provided with a moving slot 202*a*-1, the upper end of the moving slot 202*a*-1 is not closed, the second connecting plate 202*b* is provided with a third cylinder 202*b*-1 matched with the moving slot 202*a*-1, and the third cylinder 202*b*-1 is equal to the height of the second cylinder 201*b*-12. Only in this way can the third cylinder 202*b*-1 be separated from the moving slot 202*a*-1 when the end cap 102 is rotated.

It should be noted that when the first cylinder 201*b*-11 is at the lowest point of the vertical segment 201*a*-11, the included angle between the second connecting lever 201*g* and the first connecting lever 201*e* is an acute angle, and the angle thereof is preferably 10°-30°, so that it is more convenient to push the first connecting plate 201*b*.

The sleeve 101 comprises a first half cylinder 101*a* and a second half cylinder 101*b*, and the first half cylinder 101*a* and the second half cylinder 101*b* are connected by bolts, with the access port M arranged in the middle of the first half cylinder 101*a*.

Furthermore, the end cap 102 is provided with a sealing bulge 102*b*, and the access port M is provided with a sealing groove M-1 matched with the sealing bulge 102*b*.

The sleeve assembly 100 further comprises a rubber strip 104, and the inner sides of the first half cylinder 101*a* and the second half cylinder 101*b* are equidistantly provided with a plurality of slots 101*c* matched with the rubber strips 104. In addition, it is preferable to set an insulating rubber pad at the junction of the sealing bulge 102*b* and the sealing groove M-1, because the transformer has a certain degree of magnetic leakage, and a movable sleeve made of metal material will generate eddy current heating. By arranging a plurality of rubber strips 104, generation of the eddy current effect can be effectively prevented.

Any cross section of the rubber strip 104 is an isosceles trapezoid, and its smaller side is arranged on the inner side of the sleeve 101. It is convenient to engage the rubber strip 104 in the slot 101*c*.

Figure 3:
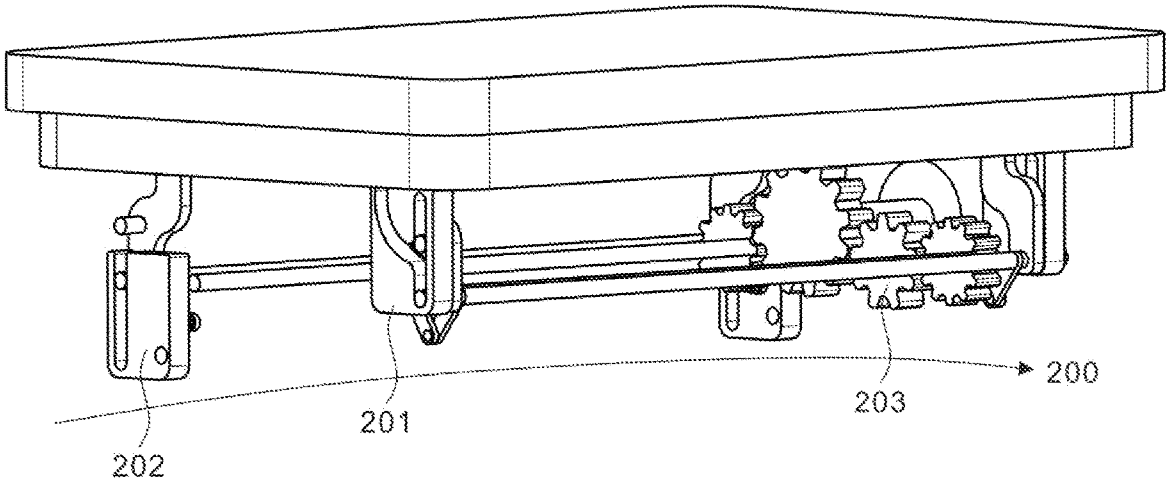
FIG. 3 is a schematic diagram of the connecting component of the movable sleeve of the 220 kV transformer for easy maintenance in example 1.
Figure 4:
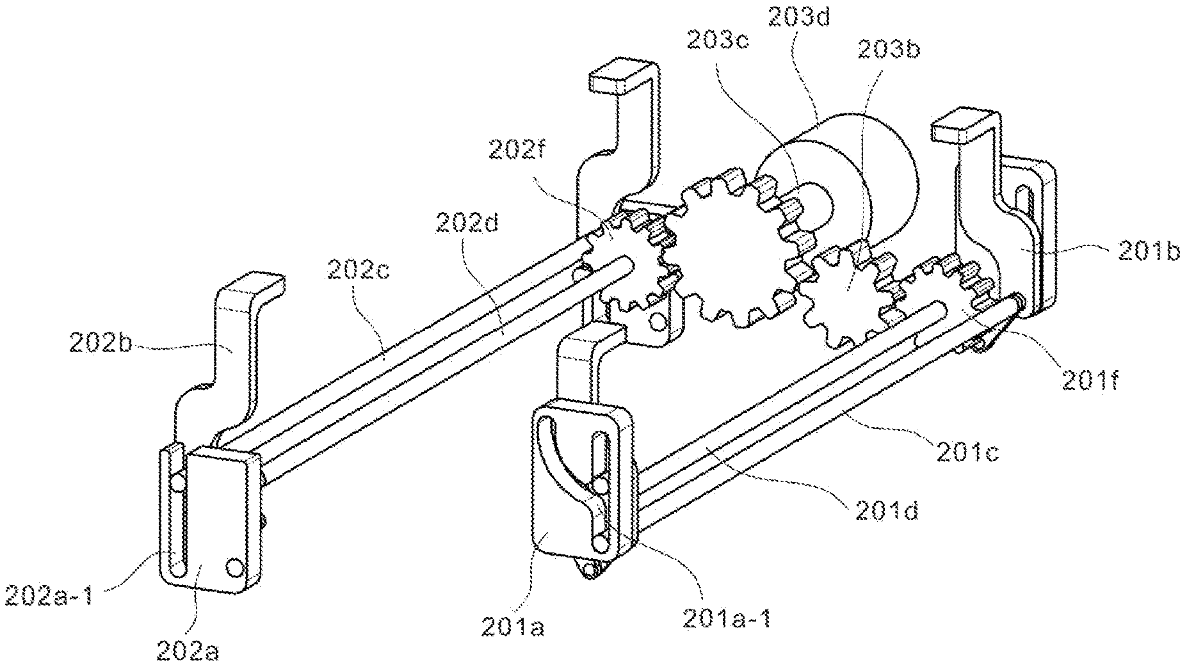
FIG. 4 is a specific structural diagram of the connecting component of the movable sleeve of the 220 KV transformer for easy maintenance in example 1.
Figure 5:
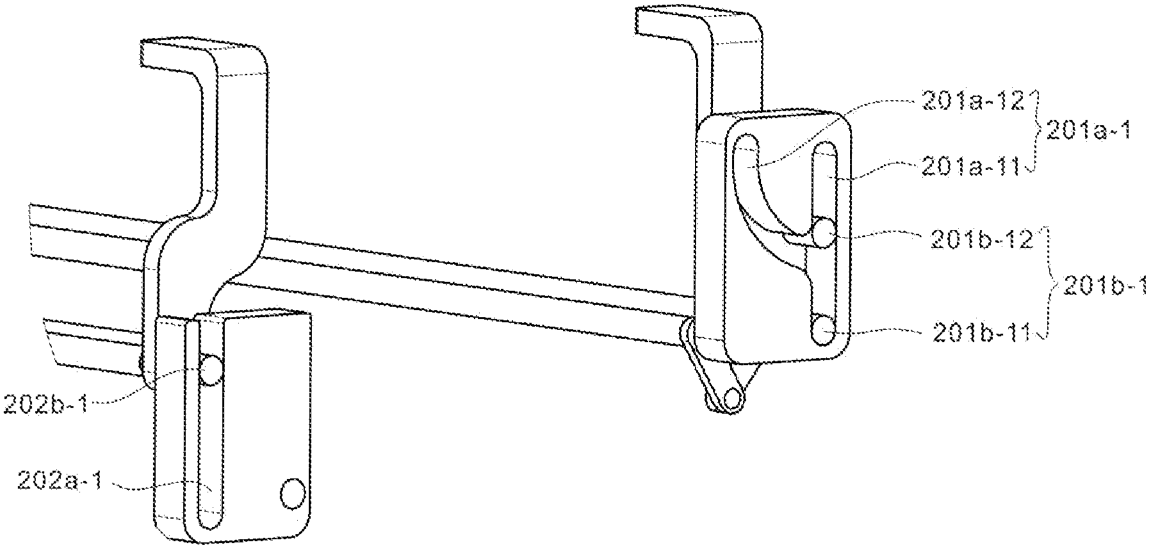
FIG. 5 is a schematic diagram of the trajectory slot and the moving slot of the movable sleeve of the 220 KV transformer for easy maintenance in example 1.
Figure 6:
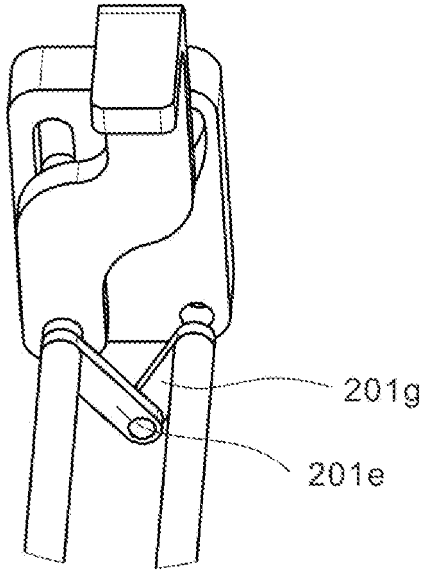
FIG. 6 is a schematic diagram of the first connecting lever and the second connecting lever of the movable sleeve of the 220 KV transformer for easy maintenance in example 1.
Figure 7:
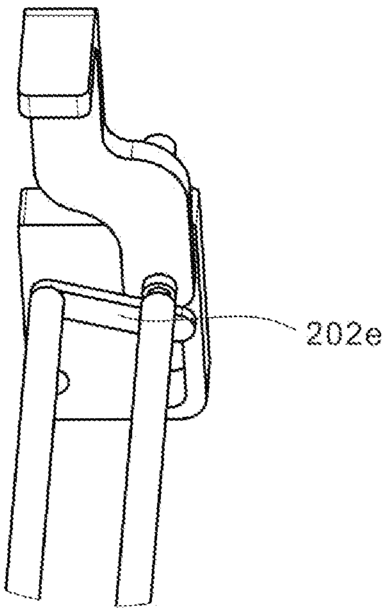
FIG. 7 is a schematic diagram of the third connecting lever of the movable sleeve of the 220 KV transformer for easy maintenance in example 1.
Figure 8:
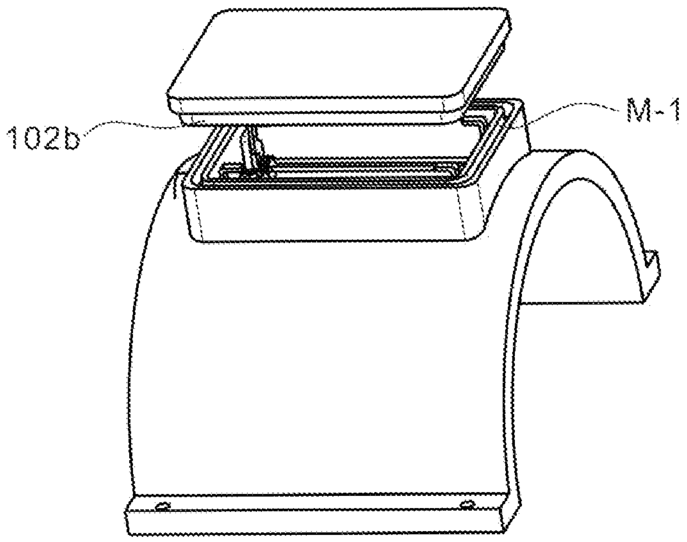
FIG. 8 is a schematic diagram of the end cap and the access port of the movable sleeve of the 220 KV transformer for easy maintenance in example 1.
Figure 9:
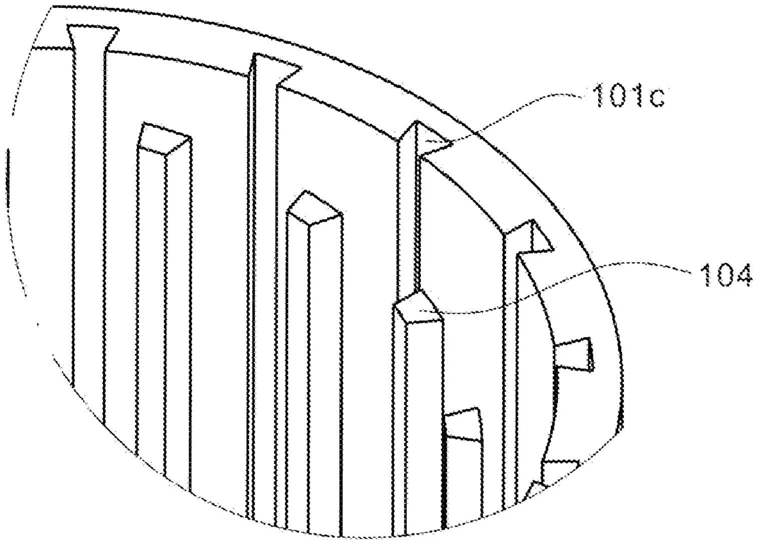
FIG. 9 is a schematic diagram of the rubber strip and the slot of the movable sleeve of the 220 KV transformer for easy maintenance in example 1.

The driving lever 203*c* is a worm, and the first gear 201*f* and the fourth gear 203*b* are cooperated with the worm gear of the driving lever 203*c* at the same time. It should be noted that, the driving lever 203*c* can also be a gear lever, as shown in FIG. 3 and FIG. 4; that is, a gear is connected to it, and the gear is engaged with the first gear 201*f* and the fourth gear 203*b*.

The reason for using a worm in this embodiment is that the worm gear has a self-locking function, so that when the motor 203*d* drives the end cap 102 to closely fit the access port M, the motor 203*d* is stopped, the end cap 102 will not loosen, and it will still be in close contact with the access port M. If a gear is used, the end cap 102 and the access port M need to be tightened with additional bolts.

When in use, the first half cylinder 101*a* and the second half cylinder 101*b* are firstly fixed on the transformer cylinder, and then the moving part 202 is driven through the driving part 203, so that the end cap 102 can be closed on the access port M. When maintenance is required, the motor 203*d* is controlled to rotate, so that the end cap 102 is separated from the access port M, and then the staff can perform maintenance.

It should be noted that the above embodiments are only used to illustrate the technical solutions of the present invention and not to limit them, although the present invention has been described in detail with reference to the preferred embodiments. Those of ordinary skill in the art should understand that modifications or equivalent substitutions can be made to the technical solutions of the present invention without departing from the spirit and scope of the technical solutions of the present invention, which should all be covered by the scope of the claims of the present invention.

What is claimed is:

1. A 220 KV transformer movable sleeve comprising:

a sleeve assembly (100), wherein the sleeve assembly (100) comprises a sleeve (101) and an end cap (102), wherein the sleeve (101) is provided with an access port (M), wherein the access port (M) cooperates with the end cap (102); and a connecting component (200), wherein the connecting component (200) is configured to connect the access port (M) and the end cap (102), which includes a rotating part (201), a moving part (202) and a driving part (203), the rotating part (201) comprising a first trajectory plate (201*a*) fixed on the inner side of the access port (M), a first connecting plate (201*b*) arranging on the side of a first trajectory plate (201*a*), a first connecting column (201*c*) connecting the two first connecting plates (201*b*), a first gear shaft (201*d*) arranged on one side of the first connecting column (201*c*), a first connecting lever (201*e*) hinging on the first connecting column (201*c*), a second connecting lever (201*g*) fixedly connecting to the first gear shaft (201*d*) and a first gear (2010 arranging on the first gear shaft (201*d*);

the moving part (202) is symmetrically arranged with the rotating part (201), which comprising a second trajectory plate (202*a*) fixed on the inner side of the access port (M), a second connecting plate (202*b*) arranged on the side of the second track plate (202*a*), a second connecting column (202*c*) connecting the two second connecting plates (202*b*), a third gear shaft (202*d*) arranging on one side of the second connecting column (202*c*), a third connecting lever (202*e*) fixedly connecting to the third gear shaft (202*d*), and a third gear (2020 arranging on the third gear shaft (202*d*), and the side of the third connecting lever (202*e*) is fitted with the second connecting column (202*c*);

the driving part (203) is configured to drive the first gear (2010 and the third gear (2020 to rotate.

2. The 220 KV transformer movable sleeve according to claim 1, wherein the driving part (203) comprises a fourth gear (203*b*) engaged with the first gear (201*f*), a driving lever (203*c*) matched with the first gear (2010 and the fourth gear (203*b*), and a motor (203*d*) matched with the driving lever (203*c*).

3. The 220 KV transformer movable sleeve according to claim 2, wherein one end of the first connecting plate (201*b*) is fixed on the end cap (102), wherein the first trajectory plate (201*a*) is provided with a trajectory slot (201*a*-1), and the first connecting plate (201*b*) is provided with a snap cylinder (201*b*-1) matched with the trajectory slot (201*a*-1).

4. The 220 KV transformer movable sleeve according to claim 3, wherein the track slot (201*a*-1) comprising a vertical segment (201*a*-11) and a rotating segment (201*a*-12), the snap cylinder (201*b*-1) comprising a first cylinder (201*b*-11) and a second cylinder (201*b*-12), and the distance between the first cylinder (201*b*-11) and the second cylinder (201*b*-12) is the same as the radius of the rotating segment (201*a*-12), the joint point of the rotating segment (201*a*-12) and the vertical segment (201*a*-11) is arranged in the middle of the vertical segment (201*a*-11).

5. The 220 KV transformer movable sleeve according to claim 4, the second trajectory plate (202*a*) is provided with a moving slot (202*a*-1), the upper end of the moving slot (202*a*-1) is not closed, the second connecting plate (202*b*) is provided with a third cylinder (202b-1) matched with the moving slot (202a-1), and the third cylinder (202b-1) is equal to the height of the second cylinder (201b-12).

6. The 220 KV transformer movable sleeve according to claim 5, wherein the sleeve (101) comprising a first half cylinder (101a) and a second half cylinder (101b), and the first half cylinder (101a) and the second half cylinder (101b) are connected by bolts, the access port (M) is arranged in the middle of the first half cylinder (101a).

7. The 220 KV transformer movable sleeve according to claim 6, wherein the end cap (102) is provided with a sealing bulge (102b), the access port (M) is provided with a sealing groove (M-1) matched with the sealing bulge (102b).

8. The 220 KV transformer movable sleeve according to claim 7, wherein the sleeve assembly (100) further comprises a rubber strip (104), the inner sides of the first half cylinder (101a) and the second half cylinder (101b) are equidistantly provided with a plurality of slots (101c) matched with the rubber strips (104).

9. The 220 KV transformer movable sleeve according to claim 8, wherein any cross section of the rubber strip (104) is isosceles trapezoid, and its smaller side is arranged on the inner side of the sleeve (101).

10. The 220 KV transformer movable sleeve according to claim 9, wherein the driving lever (203c) is a worm, and the first gear (201f) and the fourth gear (203b) are cooperated with the worm gear of the driving lever (203c) at the same time.

* * * * *